(12) United States Patent
Augustin et al.

(10) Patent No.: US 10,384,419 B2
(45) Date of Patent: Aug. 20, 2019

(54) BAFFLE

(71) Applicant: SIKA TECHNOLOGY AG, Baar (CH)

(72) Inventors: Daniel Augustin, Munich (DE); Simon Gruber, Münsingen (DE); Stefan Mieslinger, Landshut (DE); Vincent Belpaire, Uccle (BE); Mike Fasse, Mussey, MI (US)

(73) Assignee: SIKA TECHNOLOGY AG, Baar (CH)

( * ) Notice: Subject to any disclaimer, the term of this patent is extended or adjusted under 35 U.S.C. 154(b) by 116 days.

(21) Appl. No.: 15/619,030

(22) Filed: Jun. 9, 2017

(65) Prior Publication Data

US 2017/0355171 A1    Dec. 14, 2017

(30) Foreign Application Priority Data

Jun. 10, 2016    (EP) .................................... 16173897

(51) Int. Cl.
| | |
|---|---|
| *B32B 5/20* | (2006.01) |
| *B62D 25/00* | (2006.01) |
| *B62D 29/00* | (2006.01) |
| *B29C 44/12* | (2006.01) |
| *B32B 27/08* | (2006.01) |

(Continued)

(52) U.S. Cl.
CPC ................ *B32B 5/20* (2013.01); *B29C 44/12* (2013.01); *B32B 27/08* (2013.01); *B60R 13/08* (2013.01); *B62D 25/00* (2013.01); *B62D 29/002* (2013.01); *B62D 29/04* (2013.01); *B29K 2105/04* (2013.01); *B29K 2995/0002* (2013.01); *B29L 2031/30* (2013.01); *B32B 2307/102* (2013.01); *B32B 2605/00* (2013.01)

(58) Field of Classification Search
CPC ..... B32B 5/20; B29C 44/1228; B62D 29/002; B60R 13/08
See application file for complete search history.

(56) References Cited

U.S. PATENT DOCUMENTS

2012/0028032 A1*  2/2012  Chmielewski ............ B32B 5/18
                                                            428/319.3

FOREIGN PATENT DOCUMENTS

| DE | 101 48 770 A1 | 4/2003 |
|---|---|---|
| EP | 1362683 A2 | 11/2003 |

(Continued)

OTHER PUBLICATIONS

Jul. 31, 2018 Office Action issued in Europran Patent Application No. 16173897.6.

(Continued)

*Primary Examiner* — Elizabeth E Mulvaney
(74) *Attorney, Agent, or Firm* — Oliff PLC

(57) ABSTRACT

A baffle or reinforcement element for sealing and/or reinforcing a cavity, in particular a cavity of a vehicle, comprising: a carrier plate with a first plate surface and a second plate surface, and at least a first and a second expandable element, in particular expandable foam element, supported by the carrier plate, wherein the first expandable element covers, at least substantially, the entire first plate surface and forms a first outer surface of the baffle or reinforcement element and the second expandable element covers, at least substantially, the entire second plate surface thereby forming a second outer surface of the baffle element.

14 Claims, 1 Drawing Sheet

(51) Int. Cl.
*B60R 13/08* (2006.01)
*B62D 29/04* (2006.01)
B29K 105/04 (2006.01)
B29L 31/30 (2006.01)

(56) References Cited

FOREIGN PATENT DOCUMENTS

| EP | 2542403 B1 | 5/2015 |
| WO | 98/36944 A1 | 8/1998 |
| WO | 2008/014053 A2 | 1/2008 |
| WO | 2010/097120 A1 | 9/2010 |
| WO | 2014/095620 A1 | 6/2014 |
| WO | 2015/063151 A1 | 5/2015 |

OTHER PUBLICATIONS

Nov. 22, 2016 Extended Search Report issued in European Patent Application No. 16173897.6.
May 13, 2019 Office Action issued in European Patent Application No. 16 173 897.6.

* cited by examiner

BAFFLE

TECHNICAL FIELD

The present invention relates to a baffle or reinforcement element for sealing and/or reinforcing a cavity, in particular a cavity of an automotive vehicle and a method for producing a baffle or reinforcement element.

TECHNICAL BACKGROUND

In general, baffle elements are provided to separate wet parts from dryer parts. Usually, such elements have a disc or plate like shape. The main purpose of an expandable element is to "bridge", a slot between the element and the wall of the car body (usually made of steel, aluminium or reinforced composites) so that a watertight compartment within the car body is obtained.

WO 2015/063151 A1 describes a baffle or reinforcement element for ceiling and/or reinforcing a cavity and a method for producing such a baffle or reinforcement element. The baffle or reinforcement element comprises a carrier element and an expandable element supported by the carrier element. In a first embodiment of WO 2015/063151 A1, the carrier element and a cover element define a profile forming a peripheral recess for receiving the expandable element. In another embodiment, the expandable element is arranged on an edge of the carrier element. In essence, WO 2015/063151 A1 discloses a simple structure for a baffle or reinforcement element which is easy to assemble, in particular manually. However, the noise reduction characteristics of such a baffle or reinforcement element could be improved.

Document EP 1 362 683 A2 describes a baffle element (baffle precursor) comprising two cellular plates with a foamable material arranged therebetween. The plates are joined by integrally molded hinges. Stops are provided on the plates to provide a gap of predetermined thickness between the plates when they are superimposed. The foamable material is arranged within the gap. The plates are provided with a series of holes. The foamable material fills the entire gap between the plates and penetrates through the holes of the plates, if heat is activated. The manufacturing method of document EP 1 362 683 A2 appears to be rather complex and expensive.

WO 2014/095620 A1 discloses an insulation element for the acoustic insulation of an opening and/or of a cavity in a vehicle or building, having a carrier element and an expandable material. The carrier element has a plurality of through-holes, wherein only one surface of the carrier element is covered at least partially with expandable material, and the expandable material at least partially fills the through-holes. The central idea of WO 2014/095620 A1 is to have only one surface of the carrier element covered with expandable material (in the original un-expanded state). However, the reinforcement properties of the insulation element of WO 2014/095620 A1 are not satisfying for a some applications. Also, the manufacturing method appears to be comparatively complex.

EP 2 542 403 B1 discloses a method of forming a composite laminate for providing sealing, baffling or reinforcement to a structure, wherein an epoxy-based expandable structural foam material is located onto a reinforcement layer to form the composite laminate. The reinforcement layer is provided by a thermoplastic film with a thickness of 0.18 mm. In EP 2 542 403 B1, in particular the noise reduction characteristics could be improved.

SUMMARY

It is an object of the present invention to propose a simple structure for a baffle or reinforcement element which is easy to manufacture and shows improved noise reduction characteristics.

According to the invention, a baffle or reinforcement element for sealing and/or reinforcing a cavity, in particular cavity of a vehicle, comprises a carrier plate with a first (upper) plate surface and a second (lower) plate surface, and a first and second expandable element, in particular expandable foam element, supported by the carrier plate, wherein the first expandable element covers (at least substantially) the entire first (e.g. upper and/or lower) plate surface and forms an outer surface of the baffle or reinforcement element and the second expandable element covers (at least substantially) the entire second plate surface and forms a second outer surface of the baffle element.

A core idea of the present invention is to provide the entire upper and lower surface of a carrier plate with expandable material so that the expandable material forms (part of) the outside of the baffle or reinforcement element. In view of the prior art, the central aspect of the present invention is a new approach for the structure of a baffle or reinforcement element. Due to the combination of a carrier plate with expandable material on both sides a simple structure with reliable reinforcement and also improved noise absorption characteristics is achieved. The carrier plate provides a (main) support structure supporting the expandable material. Finally, the structure can be manufactured in only a few simple manufacturing steps.

In comparison with EP 1 362 683 A2, the structure of the present invention is rather simple and the noise reduction (with the same material expenses) reduced. In particular, the mushroom-like structures of EP 1 362 682 A2 and the sandwich structure of the baffle element is complex and material consuming. Contrary to EP 2 542 403 B1, where the structural foam is the central supporting structure, in the present invention, the carrier plate allows for a broad variety of sound absorbing (foaming) materials.

The terms "expandable element" and "expandable foam element" should be understood as parts being expandable under certain physical and/or chemical treatments, e.g. under application of heat. The term "expandable" describes a state of the respective element before an expansion step. As opposed thereto, the term "expanded" describes a state after expansion (heat application and the like). The term "baffle or reinforcement element" preferably means an element which is suitable for providing a baffle and/or reinforcement within a cavity, in particular of an automotive vehicle if the expandable (foam) element of the baffle or reinforcement element is in an expanded state. If not explicitly stated otherwise, a "baffle or reinforcement element" comprises the expandable (foam) element in its unexpanded state. The term "expanded baffle or reinforcement element", however, describes an element where the (foam) element is expanded (="expanded element" or "expanded foam element"). An "expandable element" keeps its expanded volume after the expansion treatment (e.g. heating treatment).

The term "plate" (or "plate-like structure") shall be understood as a thin element with a thickness which is comparatively lower than the largest diameter of the plate. In particular, the thickness is not more than 10%, preferably not more than 5% of a maximum diameter of the plate. Moreover, the plate has a first (upper) planar surface and a second (lower) planar surface and, at its periphery, an edge area. The plate can have the form of a polygon and/or may have straight and/or rounded edge portions.

A coverage of "at least substantially" the entire first surface of the carrier plate (and/or second carrier plate, respectively) means preferably a coverage of at least 90%, in particular 95%, preferably 99% of the first plate surface (or second plate surface respectively).

In an alternative embodiment, the first and/or second expandable element covers at least parts of an edge area of the carrier plate. Such a structure may improve the noise reduction properties.

A weight of the first and/or second expandable element per surface area of the carrier plate may be more than 0.05 g/cm$^2$, preferably more than 0.10 g/cm$^2$, further preferably more than 0.15 g/cm$^2$, even further preferably more than 0.18 g/cm$^2$ and/or less than 0.70 g/cm$^2$, preferably less than 0.50 g/cm$^2$, further preferably less than 0.30 g/cm$^2$, even further preferably less than 0.23 g/cm$^2$ 0.20 g/cm$^2$. Thereby, reliable reinforcement and good noise reduction can be achieved.

A thickness of the carrier plate may be more than 0.1 mm, preferably more than 2.5 mm, further preferably more than 4.0 mm, even further preferably more than 5.0 mm and/or less than 10 mm, preferably less than 8.5 mm, further preferably less than 7.0 mm, even further preferably less than 6.0 mm. Thereby, the carrier plate can reliable support the entire structure so that an improved reinforcement and noise reduction can be achieved.

First and second expandable elements can be separated from each other (e.g. if the edge area of the carrier plate is kept free from expandable material). Alternatively, first and second expandable elements may contact each other and may, in particular, be formed by one piece of material. For example, a combined first and second expandable element may extend around the edge area of the carrier plate (at least in part).

In another embodiment, at least part of the edge area (in particular the whole edge area) of the carrier plate is kept free from any expandable material (in its original state). Such a solution is easy to manufacture and still provides a sufficient noise reduction.

The carrier plate is preferably free from any through-holes (i.e. does not contain any through-holes). This further reduces reduction costs resulting in a low complexity of the product and still a good performance regarding sound dampening.

The carrier plate may be made of plastic material, in particular polymer material, preferably PA (polyamide) and/or nylon and/or PP (polypropylene) and/or HDPE (high density polyethylene) and/or LDPE (low density polyethylene) and/or metal, in particular steel and/or aluminium (alloy).

The first and/or second expandable material may be made of, in particular closed-pore foamable material, in particular a thermoplastic and/or polymeric material such as a copolymer of ethylene and a vinyl and/or acrylic ester such as vinyl acetate, vinyl propionate, methyl acrylate, ethyl acrylate and butyl acrylate or a rubbery polymer such as an ethylene propylene copolymer rubber or more desirably an ethylene, propylene dieneter polymer rubber.

A thickness of the expandable (foam) element is preferably more than 1 mm, further preferably more than 2 mm, even further preferably more than 5 mm and/or less than 20 mm, preferably less than 15 mm, even further preferably less than 10 mm, even further preferably less than 8 mm.

Preferably, the first and/or second expandable (foam) element is made by extrusion or injection molding.

The expandable (foam) element may expand to at least 50%, preferably at least 200%, further preferably at least 400%, further preferably at least 800%. An upper limit for the expansion may be 3000% or 2000% or 1700%. A preferred expansion value may be in the range of 1200% to 2000%. An expansion of 100% means that the expanded volume is twice the volume of the initial volume. An expansion of 200% means that the expanded volume is 3 times that of the unexpanded volume. An expansion of 50% means that the expanded volume is 1.5 times that of the unexpanded volume. In general, an expansion of X % means an additional volume of X % compared with the initial (unexpanded) volume.

Preferably, a heat application is between 120 to 250° C., e.g. 200° C. and is applied for a time of 1 to 60 minutes in particular 5 to 10 minutes, e.g. 5 minutes. If the expandable foam is a sealing foam, the expansion rate might be 100% to 3000%, in particular 500% to 2000%. If the expandable foam is a reinforcing foam, the expansion rate might be 50% to 300%, in particular 100% to 200%.

A material of first and/or second expandable (foam) element may be as described in WO 2016/005536 A1 (which is incorporated herein by reference).

In an embodiment, the material of the first and/or second expandable (foam) element may be the material Sika-Baffle®, in particular SikaBaffle®-420, preferably in its (EU) version of Aug. 28, 2014. This material is a high expanding, thermoplastic, injection-molded/profile extruded cavity sealer in particular for treatment in automotive applications. The volumetric expansion during a heat treatment of 160° C. for 20 minutes is above 1200%.

The first and/or second expandable (foam) element may have (in its original state) a plate shape. In particular, the shape (contour) of the first and/or second carrier element can be (at least substantially) identical to the shape (contour) of the carrier plate. In any case, such expandable elements can be easily arranged upon and connected with the carrier plate.

The objective above is solved by an expanded baffle or reinforcement element produced by a baffle or reinforcement element, as described above, wherein the expandable (foam) element is expanded.

As a further independent aspect of the invention, a method for producing a baffle or reinforcement element (in particular, for producing a baffle or reinforcement element as described above) comprises the steps:
  a) providing a carrier plate with a first plate surface and a second plate surface;
  b) covering, at least substantially, the entire first plate surface with a first expandable element, in particular expandable foaming element so that the expandable foaming element forms an outer surface of the baffle or reinforcement element and covering (at least substantially) the entire second plate surface with a second expandable element, in particular expandable foaming element so that the expandable foaming element forms an outer surface of the baffle or reinforcement element.

Further features of the method can be taken from the above description of the baffle or reinforcement element.

According to an independent aspect of the present invention, a system comprises a baffle or reinforcement element as described above and/or produced by the method as described above and a cavity (of a vehicle) for receiving the baffle or reinforcement element and/or a vehicle (comprising a cavity for receiving the baffle or reinforcement element).

In an application, the baffle or reinforcement element is arranged within the cavity, wherein the expandable (foam) element is expanded so that the expandable (foam) elements touch the walls of the cavity. According to a further independent aspect of the present invention, a use of a baffle or reinforcement element as described above and/or produced by the method as described above for sealing and/or reinforcing a cavity, in particular cavity of a vehicle (preferably for noise reduction) is proposed.

BRIEF DESCRIPTION OF THE DRAWINGS

In the following preferred embodiments of the present invention are described with reference to the drawings. These show.

DETAILED DESCRIPTION OF EMBODIMENTS

Figure 1:
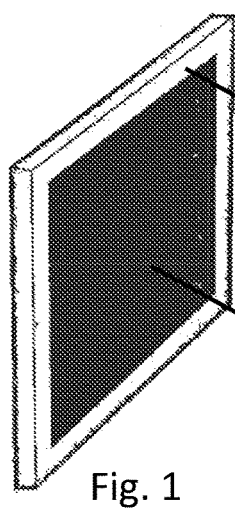
FIG. 1 an oblique view of a baffle or reinforcement element according to the prior art.
Figure 2:
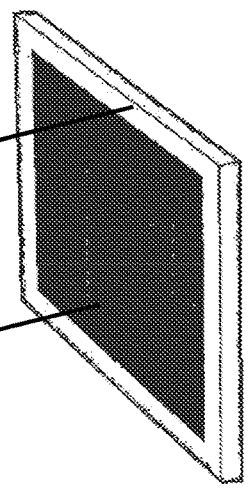
FIG. 2 a further oblique view of the baffle or reinforcing element according to FIG. 1.

FIGS. 1 and 2 show a baffle and/or reinforcing element according to the prior art. A carrier plate 1 (e.g. based on polyamide) supports an expandable foam element 2 running along the edge of the carrier plate 1.

Figure 3:
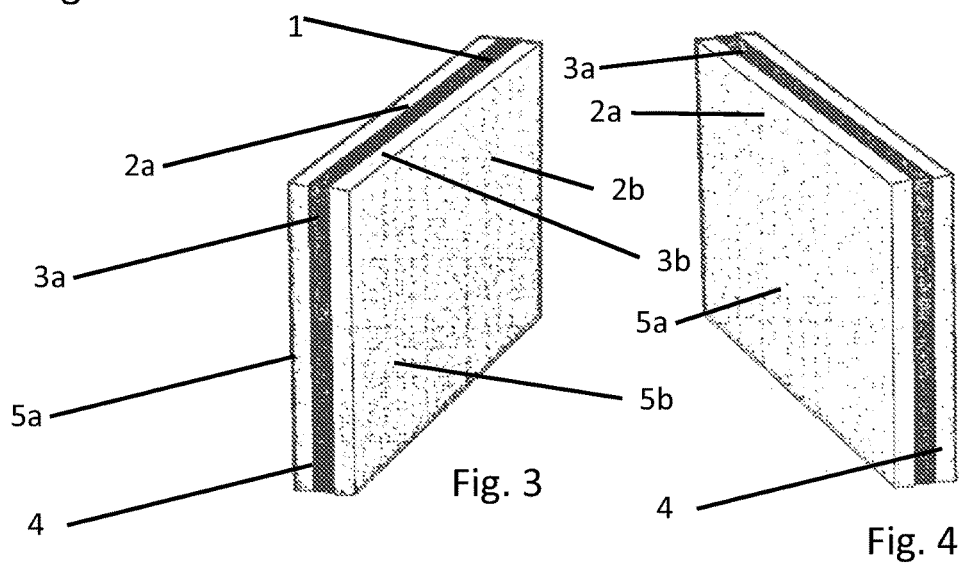
FIG. 3 an oblique view of a baffle and/or reinforcing element according to an embodiment of the invention.
Figure 4:
FIG. 4 a further oblique view of the embodiment of FIG. 3.

A first embodiment of the present invention is shown in FIGS. 3 and 4. There, the carrier plate 1 supports a first expandable foam element 2a and a second expandable foam element 2b so that a first plate surface 3a and a second plate surface 3b are (entirely) covered by the expandable foam elements 2a, 2b. As can be seen, an edge area 4 is free from any expandable material. The expandable foam elements form a first outer surface 5a or a second outer surface 5b of the baffle and/or reinforcing element, respectively.

REFERENCE SIGNS

1 Carrier plate
2 Expandable element
2a First expandable element
2b Second expandable element
3a First plate surface
3b Second plate surface
4 Edge area
5a First outer surface
5b Second outer surface

The invention claimed is:

1. A baffle comprising:
a carrier plate with a first plate surface and a second plate surface; and
a first and a second expandable element, supported by the carrier plate, wherein the first expandable element covers, at least substantially, the entire first plate surface and forms a first outer surface of the baffle, and the second expandable element covers, at least substantially, the entire second plate surface and forms a second outer surface of the baffle element,
wherein a thickness of the carrier plate is more than 2.5 mm, and
wherein the first and/or second expandable element has an expansion rate of more than 1200%.

2. The baffle of claim 1, wherein the first and/or second expandable element covers at least parts of an edge area of the carrier plate.

3. The baffle of claim 1, wherein a weight of the first and/or second expandable element per surface area of the carrier plate is more than 0.05 g/cm$^2$.

4. The baffle of claim 1, wherein at least part of the edge area of the carrier plate is kept free from any expandable material.

5. The baffle of claim 1, wherein the carrier plate is free from any through-holes.

6. The baffle of claim 1, wherein the carrier plate is made of plastic material and/or the first and/or second expandable element is made of a foamable material.

7. The baffle of claim 1, wherein the material of the expandable element is a sealing foam.

8. The baffle of claim 1, wherein the first and/or second expandable element has, in its original state, a plate shape.

9. An expanded baffle comprising the baffle of claim 1, wherein the expandable element is expanded.

10. A method for producing the baffle according to claim 1, the method comprising the steps of:
providing a carrier plate with a first plate surface and a second plate surface, the carrier plate having a thickness that is more than 2.5 mm;
covering, at least substantially, the entire first plate surface with a first expandable element so that the first expandable element forms an outer surface of the baffle, and covering, at least substantially, the entire second plate surface with a second expandable element so that the second expandable element forms an outer surface of the baffle, the first and/or second expandable element having an expansion rate of more than 1200%.

11. The method of claim 10, further comprising expanding the first and/or second expandable element so that it expands.

12. A system comprising,
the baffle of claim 1; and
a cavity for receiving the baffle.

13. A method for sealing a cavity, comprising:
providing the baffle of claim 1; and
sealing the cavity with the baffle.

14. The method of claim 10, wherein the first expandable element comprises a first expandable foaming element, and the second expandable element comprises a second expandable foaming element.

* * * * *